US010384171B2

(12) United States Patent
Reddy et al.

(10) Patent No.: US 10,384,171 B2
(45) Date of Patent: Aug. 20, 2019

(54) MODIFIED THIN FILM COMPOSITE REVERSE OSMOSIS MEMBRANE AND A PROCESS FOR PREPARATION THEREOF

(71) Applicant: COUNCIL OF SCIENTIFIC & INDUSTRIAL RESEARCH, New Delhi (IN)

(72) Inventors: Alamuru Venkata Rami Reddy, Bhavnagar (IN); Saha Nirmal Kumar, Bhavnagar (IN); Jewrajka Suresh Kumar, Bhavnagar (IN); Jitendra Jaydevprasad Trivedi, Bhavnagar (IN); Paramita Ray, Bhavnagar (IN); Nagendra Pathak, Bhavnagar (IN); Gaurang Shambuprasad Trivedi, Bhavnagar (IN); Temubha Bhupatsinh Gohil, Bhavnagar (IN); Rahul Shubhash Patil, Bhavnagar (IN)

(73) Assignee: Council of Scientific & Industrial Research, New Delhi (IN)

( * ) Notice: Subject to any disclaimer, the term of this patent is extended or adjusted under 35 U.S.C. 154(b) by 566 days.

(21) Appl. No.: 14/647,065

(22) PCT Filed: Nov. 25, 2013

(86) PCT No.: PCT/IN2013/000711
§ 371 (c)(1),
(2) Date: May 22, 2015

(87) PCT Pub. No.: WO2014/080426
PCT Pub. Date: May 30, 2014

(65) Prior Publication Data
US 2015/0290595 A1    Oct. 15, 2015

(30) Foreign Application Priority Data
Nov. 23, 2012 (IN) ............................ 3600/DEL/2012

(51) Int. Cl.
*B01D 71/56* (2006.01)
*B01D 67/00* (2006.01)
(Continued)

(52) U.S. Cl.
CPC ......... *B01D 71/56* (2013.01); *B01D 67/0006* (2013.01); *B01D 67/0088* (2013.01);
(Continued)

(58) Field of Classification Search
CPC ............... B01D 71/56; B01D 67/0088; B01D 67/0006; B01D 69/125; B01D 2323/12;
(Continued)

(56) References Cited

U.S. PATENT DOCUMENTS

| 4,277,344 A | 7/1981 | Cadotte |
| 4,894,165 A * | 1/1990 | Fibiger .............. B01D 67/0088 210/654 |
| 2013/0112618 A1* | 5/2013 | Diallo .................... B01D 71/76 210/641 |

FOREIGN PATENT DOCUMENTS

| EP | 0432358 | 6/1991 |
| WO | 2007/035019 | 3/2007 |

OTHER PUBLICATIONS

International Search Report dated Mar. 18, 2014.
(Continued)

*Primary Examiner* — Taiwo Oladapo
(74) *Attorney, Agent, or Firm* — Workman Nydegger

(57) ABSTRACT

The present invention relates to a complete process for preparation of high flux and salt rejection thin film composite (TFC) reverse osmosis (RO) membrane including process for preparation of support membrane for thin film, process for thin film coating of support membrane by in-situ interfacial polymerization between diamines and trimesoyl chloride, machine design, chemistry and details of process (Continued)

(engineering+chemistry+ambient) parameter at 1×100 sqm scale upgradeable to a scale even 10-20 times higher. The produced membrane is characterized by 96% salt rejection and 48 LM-2H 1 flux with 2000 ppm sodium chloride solution at 250 psi pressure and 95% salt rejection and 46 LM2H 1 flux with 35000 ppm sodium chloride solution at 900 psi pressure. The present invention also relates to complete machine design for PSF ultrafiltration membrane casting and coating for TFC membrane production at commercial level.

4 Claims, 4 Drawing Sheets

(51) Int. Cl.
    *B01D 69/12*     (2006.01)
    *C02F 1/44*      (2006.01)
    *C02F 101/10*    (2006.01)
    *C02F 103/08*    (2006.01)
(52) U.S. Cl.
    CPC ....... *B01D 67/0093* (2013.01); *B01D 69/125* (2013.01); *C02F 1/441* (2013.01); *B01D 2323/12* (2013.01); *B01D 2325/28* (2013.01); *B01D 2325/30* (2013.01); *C02F 2101/10* (2013.01); *C02F 2103/08* (2013.01)
(58) Field of Classification Search
    CPC ............ B01D 2325/30; B01D 2325/28; B01D 67/0093; C02F 1/441; C02F 2101/10; C02F 2103/08
    See application file for complete search history.

(56) References Cited

OTHER PUBLICATIONS

Kim J.H. et al. "Surface Modification of nanofiltration membranes to improve the removal of organic micro-pollutants (EDCs and PhACs) in drinking water treatment: Graft polymerization and cross-linking followed by functional group substitution" *Journal of Membrane Science* vol. 321, No. 2, pp. 190-198 (2008).

Lin N.H. et al. "Polymer surface nano-structuring of reverse osmosis membranes for fouling resistance and imporved flux performance" *Journal of Materials Chemistry* vol. 20, No. 22 (2010).

Belfer S. et al. "Surface modification of commercial composite polyamide reverse osmosis membranes" *Journal of Membrane Science* vol. 139, No. 2, pp. 175-181 (1998).

* cited by examiner

MODIFIED THIN FILM COMPOSITE REVERSE OSMOSIS MEMBRANE AND A PROCESS FOR PREPARATION THEREOF

FIELD OF THE INVENTION

The present invention relates to a modified thin film composite reverse osmosis membrane and a process for preparation thereof. Particularly, the present invention provides a process for the preparation of low fouling thin film composite (TFC) reverse osmosis (RO) membrane with improved chlorine resistance.

BACKGROUND OF THE INVENTION

The availability of clean water for uses in human civilization is shrinking with the increase in population and expansion in urbanization and industrialization. As estimated by the UN nearly one-fifth of the World populations live in areas of physical water scarcity. Though the two-third of the earth is water, only around 2.5 percent is fresh water. Therefore to meet the increasing demand of fresh water, sea and brackish water desalination by membrane has been recognized as the promising technology because of the technological cleanliness involved in the process and less energy intensive nature. Reverse osmosis membranes are now worldwide accepted as having the potential to meet this huge challenge. Membrane performance is the key to the successful operation of reverse osmosis plant. High flux and high salt rejection membranes are desirable for cost effective operation of the system. Fully aromatic polyamide thin film composite reverse osmosis membranes that are capable of delivering high flux and salt rejection are available in the market from different manufacturers but, they are only few in numbers. There are also several reports published in journals and patents on TFC membranes preparation and performance.

References may be made to U.S. Pat. No. 3,926,798, wherein a process for making composite reverse osmosis membrane by coating a microporous polysulfone membrane with an aqueous solution of furfuryl alcohol and an acid catalyst capable of polymerizing the furfuryl alcohol by heat treatment is claimed by John E. Cadotte in the year 1974.

References may be made to U.S. Pat. No. 4,277,344, wherein a process for making cross-linked, interfacial polymerized reverse osmosis membranes of aromatic polyamides, particularly poly(phenylenediamine-trimesamide) for good salt rejection and flux characteristics are disclosed by John E. Cadotte in the year 1979.

References may be made to U.S. Pat. No. 7,815,987B2, wherein reported a method for coating of composite membrane with polyalkyleneoxide and polyacrylamide compounds for improvements in fouling resistance.

References may be made to U.S. Pat. No. 6,171,497, wherein preparation of high flux reverses osmosis membranes by treating polyamide membranes with chlorine as oxidizing agent was disclosed. The salt rejection is ≥99% and water flux 1.5 m3/m2-day or higher when evaluated using 500 ppm sodium chloride solution at pH 6.5, temperature 25° C., pressure 7.5 kgfcm-2.

References may be made to U.S. Pat. No. 4,894,165, wherein coating by vinyl-addition polymer is reported to enhance the salt rejection of polyamide reverse osmosis membranes.

References may even be made to U.S. Pat. No. 4,454,176, wherein a process for preparing reverse osmosis membrane has been revealed by coating aromatic polyamide, solvent and salt onto woven, unsized, polyester or aromatic polyamide fabric as porous support.

References may be made to US2009/0050558A1, wherein a process for producing reverse osmosis membrane has been revealed. The patent claims coating process for continuous preparation of reverse osmosis membranes.

References may be made to U.S. Pat. No. 8,029,857, wherein a process for producing micro- and nano-composite support structure (porous membrane) for reverse osmosis membrane has been described. Nano particles are added to the support membrane during casting. The resultant reverse osmosis membrane obtained after coating the micro-nano composite support membrane produced a membrane with more resistant to compaction when compared to the one having no such particle.

References may be made to U.S. Pat. No. 7,658,872, wherein a process for improving permeability of already prepared reverse osmosis membrane by treating with organo-ammonium nitrates salts is disclosed.

References may be made to IN244150, wherein the method for the preparation of composite membrane using different types of amines and acid chlorides has been described.

References may be made to 'Journal of Membrane Science 2010, 348(1-2), 268-276' wherein Liu, M et al. reported 'Impact of manufacture technique on seawater desalination performance of thin-film composite polyamide-urethane reverse osmosis membranes and their spiral wound elements'.

References may be made to 'Journal of Membrane Science 2008, 311(1-2), 34-45, wherein Ghosh, A. K. et al. reported the effect of interfacial reaction conditions on reverse osmosis membrane properties.

References may be made to 'Journal of Membrane Science 2008, 311(1-2), 34-45, wherein Ghosh, A. K. and Hoek E. M. V. reported effect of support membrane structure and chemistry on composite membrane properties.

The prior art have many drawbacks as follows. None of the patents given above in the prior art, covers the complete process for manufacturing thin film composite membrane, which involves three stages namely: i) preparation of polysulphone porous support membrane, ii) preparation of ultrathin polyamide active layer on the top of polysulphone porous support and finally, iii) surface modification with suitable hydrophilic polymers. Moreover, the results which were reported were based on the experiments that were carried out at a very small tray scale levels in batch-wise manner, where it was possible to vary a single parameter at a time while keeping the other variables constant. However, the continuous process of the large scale preparation of composite membrane involves the variation of more than one parameter at a time. For example, in the preparation of polysulphone porous support, when the casting rate is varied, there is a possibility for the variation in polymer solution take up time on the fabric, air travel gap before entering in to the gelation bath, shear stress, etc. These variables in turn will have considerable effect on polysulphone porous support properties like pore size and porosity with the concomitant effect on TFC membrane performance. Similarly, in the preparation of polyamide active layer on the porous support, tandem variations in the contact time with monomer solutions, reaction time between the monomers, curing time of the nascent polyamide active layer have to be optimized to produce the membrane with the desired separation performance. Hence, the major requirement is a single patent wherein the process covers all the aspects of composite membrane preparation on a commercial production.

Patents application no. 1027DEL2012 describes the preparation of TFC membranes with inherent antimicrobial properties. The TFC membranes were prepared by reaction between MPD or mixture of MPD+melamine and pyridinetricarboxylic acid chloride or mixture of pyridinetricarboxylic acid chloride+TMC. The prepared membranes exhibited superior antibiofouling property compared to conventional TFC membranes prepared with reacting TMC and MPD. Thus the main object of the said patent application was to prepare membranes with inherent antimicrobial activity. The organic fouling resistant capability and chlorine resistant property of the membranes was not described in the said patent application.

The intended patent application reveals the complete process for making thin film composite reverse osmosis membrane in a continuous manner at commercial scale production levels using semi-automated machinery. The patent covers: i) the process for continuous preparation of polysulphone porous support having the required properties, ii) the process for continuous preparation of polyamide active layer on the top of polysulphone porous support, iii) the process for surface modification of the thin film composite membrane for improving fouling resistance.

OBJECTIVE OF THE INVENTION

The main object of the present invention is to provide a modified thin film composite reverse osmosis membrane and a process for preparation thereof.

Another object of the present invention is to provide a process for the preparation of low fouling thin film composite (TFC) reverse osmosis (RO) membrane with improved chlorine resistance.

Another object of the present invention is to prepare low fouling, high flux and high rejection thin film composite reverse osmosis membranes at commercial scale levels at the rate of 20-25 m/h using semi-automated machinery.

Another objective of the present invention is to prepare polysulfone porous support membrane of ultrafiltration grade at the scale of 1 m width×200 length at the rate of 3-10 meters/min using a semi-automated casting machine.

Yet another object of the present invention is to prepare an ultrathin polyacrylamide layer on the top of polysulphone porous support by interfacial polymerization between aqueous diamine solution having two primary amine groups and trimesoyl chloride in organic phase under continuous coating process using semi-automated machine.

SUMMARY OF THE INVENTION

Accordingly, the present invention provides a modified thin film composite reverse osmosis membrane on conventional polysulphone support wherein membrane comprises polyamide ultrathin layer which is formed by reacting polyfunctional amine(s) in the range 2-3% (w/v) and polyfunctional acid chloride(s) in the range of 0.1-0.125% followed by post treatment of said nascent TFC membrane by methacrylate monomers in the mole ratio in the range of $4\times10^{-3}$ mol/L to $4\times10^{-2}$ mol/L (0.1-1% w/v) in the presence of Red-Ox initiator to enhance fouling resistance and chlorine stability compared to the conventional unmodified TFC membrane.

In one embodiment of the present invention polyfunctional amine used is m-phenylene diamine.

In an embodiment of the present invention polyfunctional acid chloride used is trimesoyl chloride (w/v).

In another embodiment of the present invention methacrylate monomer is selected from the group of methacrylic acid, sulphopropyl methacrylate, acrylamide either alone or in combination with methylene-bis-acrylamide thereof.

Still in another embodiment of the present invention said membrane is characterized by 96-97.5% salt rejection and 38-67.6 $LM^{-2}H^{-1}$ flux with 2200 ppm sodium chloride solution at 250 psi pressure.

Still in another embodiment of the present invention said membrane is useful in brackish water purification.

Still in another embodiment of the present invention said membrane is useful in high salinity water purification.

Still in another embodiment of the present invention the membrane is improved resistant to NaOCl solution compared to conventional unmodified TFC membrane.

Still in another embodiment of the present invention the membrane is improved resistant to fouling compared to conventional unmodified TFC membrane during desalination of water.

Still in another embodiment of the present invention a process for the preparation of modified thin film composite reverse osmosis membrane, wherein the said process comprising the steps of;

a. Providing polysulphone porous support on a non-woven polyester fabric by known method;
b. providing TFC membrane having polysulphone porous support on a non-woven polyester fabric coated with one amine monomer MPD and one acid chloride monomer TMC by known method followed by treating said membrane with methacrylate monomer in nitric acid in mole ratio ranging between $4\times10^{-3}$ mol/L to $4\times10^{-2}$ mol/L for a period ranging between 10-60 min at room temperature ranging between 25 to 27° C. to obtain modified thin film composite reverse osmosis membrane;
c. optionally, treating polysulphone membrane as obtained in step (a) with aqueous diamine composition which comprises 2-3% MPD (w/v), 0.5-1.5% DMSO (v/v), 0.2-1% Glycerol (v/v), 0.1-1% SPMA (sulphopropyl methacrylate) (w/v), 0-0.01% MBA (methylene-bis-acrylamide) (w/v), 0-0.1% polyvinyl alcohol (PVA) (w/v), 0.1-0.125% TMC (w/v), 0.01-0.05% DMF (v/v), hexane and 0.27-2.7% Potassium persulphate (w/v) as Red-Ox initiator at temperature ranging between 20-40° C. for a period ranging between 10-60 min followed by curing the said membrane at temperature ranging, between 50-70° C. to obtain modified thin film composite reverse osmosis membrane

DETAIL DESCRIPTION OF THE INVENTION

Figure 1:
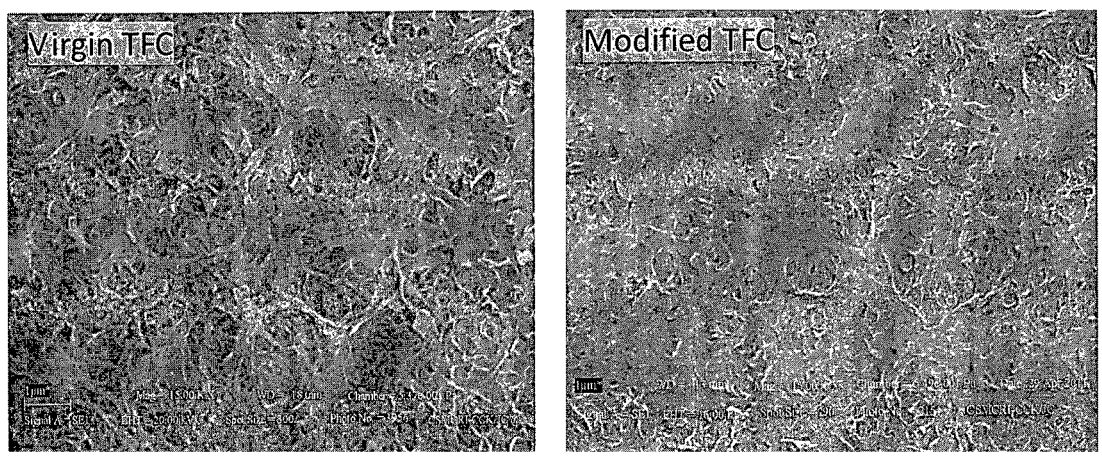
FIG. 1. Comparison between unmodified and modified membrane surface; figure shows scanning electron surface micrograph of unmodified and modified TFC membrane; modified TFC membrane displayed to have less open structure.

The present invention provides a process for the preparation of low fouling thin film composite (TFC) reverse osmosis (RO) membrane with improved chlorine resistance in two steps using the semi-automated machinery which were designed and fabricated in the laboratory for making membranes at commercial scale production levels. The first step in the process is the preparation of polysulphone porous support having about 30-40 micron thickness on a nonwoven polyester fabric using a semi-automated casting unit. The polysulphone porous support could be prepared according to wet-phase inversion method at a scale of 1 m width×100-500 length at the rate of 2-10 meters/min. Salt separating active layer containing polyamide and polymethacrylate composite matrix layer of about 150-200 nm thickness on the polysulphone porous support was then prepared by in-situ interfacial polymerization of diamine in water having 2-5% dimethylformamide and methacrylate monomer having hydrophilic functional group like sulphonic acid, carboxylic acid, hydroxy or phosphonic acid and trimesyl chloride in hexane containing dimethylsulphoxide under optimized conditions, followed by thermal curing at 60-700 C. Present invention further provides the process for making the composite membrane with improved fouling resistance by surface modification of the membrane with a thin layer of polymers containing hydrophilic functional group like sulphonic acid, carboxylic acid, hydroxy, phosphonic acid or other functional group which can minimize the membrane fouling. Such membranes showed 95-97.5% NaCl rejection with water flux of 45-65 liters/m2·h. for brackish water desalination for domestic as well as large scale applications. Present invention further relates to development of reverse osmosis membrane for sea water treatment that delivers water at a desirable rate i.e. 40-50 liters/m2·h and can be made potable by second stage membrane polishing.

The present invention relates to the process for the preparation of low fouling thin film composite polyamide reverse osmosis membrane with improved chlorine resistance by in situ interfacial polymerization between two monomers namely diamine in water and acid chloride hexane which are mutually immiscible, and the polymerization reaction taking place at the interface. m-Phenylenediamine (MPD), trimesyl chloride (TMC) are used as diamine and acid chloride respectively. Dimethylformamide (DMF) is used as additive in TMC solution; dimethylsulfoxide (DMSO) and glycerol are used as additives in MPD solution. The polysulphone membrane that is used as support for TFC membrane is prepared from 14% polysulphone solution without any additives. Polysulphone membrane is cast on polyester fabric NTS-100 from Nordlys. The complete preparation of reverse osmosis membrane involved support membrane preparation, support membrane coating with ultrathin polyamide active layer, post-treatment, and finally coating with a hydrophilic polymethacrylate layer to improve the antifouling property and chlorine resistance. There are several parameters which influence the membrane properties and these are optimized at every stage to finally produce membrane with intended properties and performances. Machine design and parameter, chemistry and engineering parameters are all optimized at commercial level and therefore can be implemented immediately at large commercial scale production levels. Thin film composite membranes prepared following the method described in the present invention are capable of producing 45-65 Lm-2 h-1 flux and 95-97.5% rejection when tested with 2000-10000 ppm sodium chloride (NaCl) solution at 250-400 psi pressure and 46 Lm-2 h-1 flux and 95% rejection when tested with 35000 ppm sodium chloride (NaCl) solution at 900 psi pressure. These results are consistently obtained at 8" diameter×40" length module and 8" diameter×40" length module level.

In the present invention, the following terminology has been used as:—

Membrane flux: Indicates the volume of water which is being permeated out (passing out) of the 1 m2 of the membrane per hour (L/m2·h)

MWCO (Molecular weight cut off) value: Indicates the lowest molecular weight of the polymer or any solute for which the membrane exhibits more than 90% rejection when tested using the solution of the polymer or solute. The units are kDa (Kilo Daltons) or Da (Daltons).

MPD solution on PSF support membrane and the interfacial reaction time in TMC bath at 30 sec. There is a provision for volume make up for TMC in batches for maintaining the constant volume. The present invention provides a process for the preparation of high flux, high salt rejection reverse osmosis polymeric membrane comprising the steps of:

Step 1: Polysulphone Support Membrane Making

Prepared 13 to 15% w/w polysulphone solution by dissolving the required quantity of polymer in DMF under constant stirring in the range of 1400 to 1600 rpm at a temperature in the range of 80 to 100° C. for a period in the range of 3 to 4 hours to prepare a transparent casting solution;

The PSF solution was allowed overnight to bring to room temperature and also to remove the air bubbles.

PSF solution thus prepared was cast on a moving polyester fabric viz., NTS-100, Hollytex-3265, Hollytex-3329, at 3-6 m/min casting speed using a semi-automated continuous membrane casting unit according to the phase inversion process. The complete machine arrangement for making PSF support membrane is shown in FIG. 1.

The casting unit consists of: i) a closed chamber for maintaining the required humidity and temperature wherein casting set-up consisting of the fabric, casting knife with micrometers, polymer solution enclosure are arranged; ii) a tank for gelation bath; iii) guiding rollers at appropriate places, and iv) a winding roller that is connected to a motor which in turn is interfaced with a computer controlled device that is capable of maintaining the set speed throughout the process.

The composition of the gelation bath was in the range of 2 to 10% of DMF and 0.1% sodium lauryl sulphate (SLS) in water.

PSF membrane thickness was adjusted precisely by maintaining a gap between casting blade and fabric support in the range 110-150 μm with the digital depth micrometers that were attached at both the ends of the casting knife.

Humidity inside the casting chamber was maintained at 15 to 25% and the temperature was maintained at 30-35° C. by blowing hot dry air.

PSF membrane thus made was washed with normal and hot RO water to remove solvent and surfactant. After washing, the water was drained off from the membrane roll by keeping the membrane role in a vertical position and then by centrifugal force using a motor driven unit and make it ready for the second step usage.

Step 2: Preparation of Polyamide Active Layer on PSF Support

Acid chloride solution was prepared by dissolving 0.1-0.15% w/v trimesyl chloride (TMC) in hexane. Diamine solution was prepared by dissolving 2-3% w/v m-phenylene-diamine (MPD), methacrylate monomer (0-2%), 0.4-1.0% v/v glycerol and 05-1.0% v/v dimethylsulphoxide (DMSO) in RO water.

Figure 2:
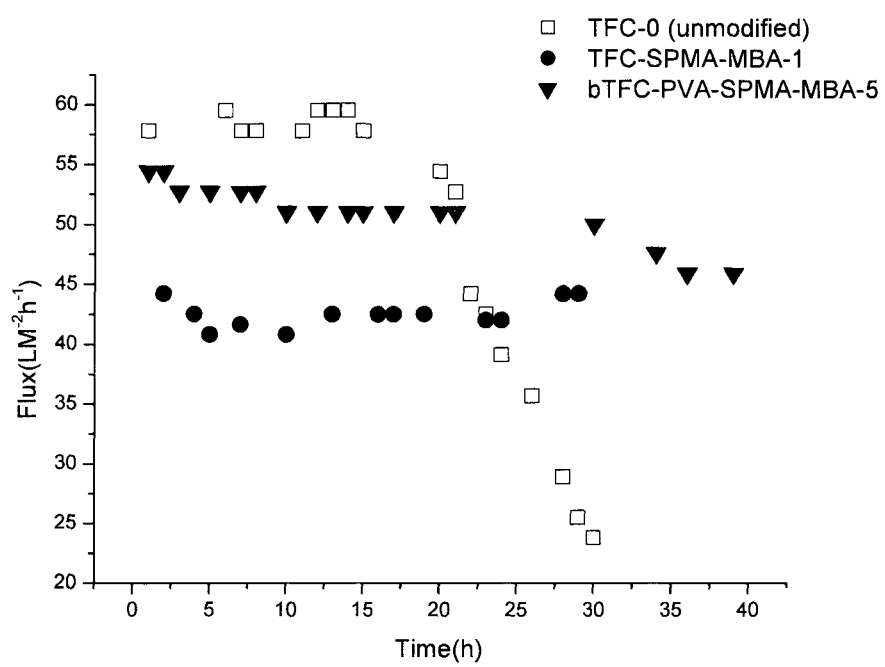
FIG. 2. Effect of modification on TFC membrane performance; modified membranes displayed less flux decline and more stable nature compared to the unmodified membranes.
Figure 3:
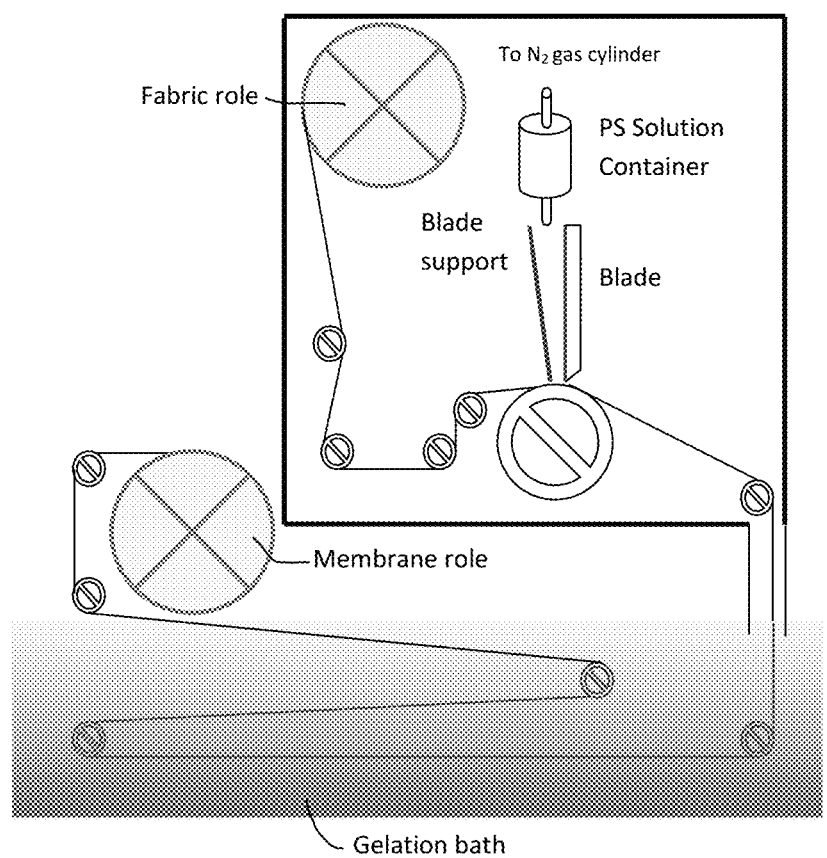
FIG. 3: Schematic depiction of a typical polysulphone support membrane casting unit. The PSF support membrane casting unit consists of: i) polymer solution tank ii) casting blade and fabric roller unit iii) gelation bath iv) membrane dragging drive and v) membrane winding roller.
Figure 4:
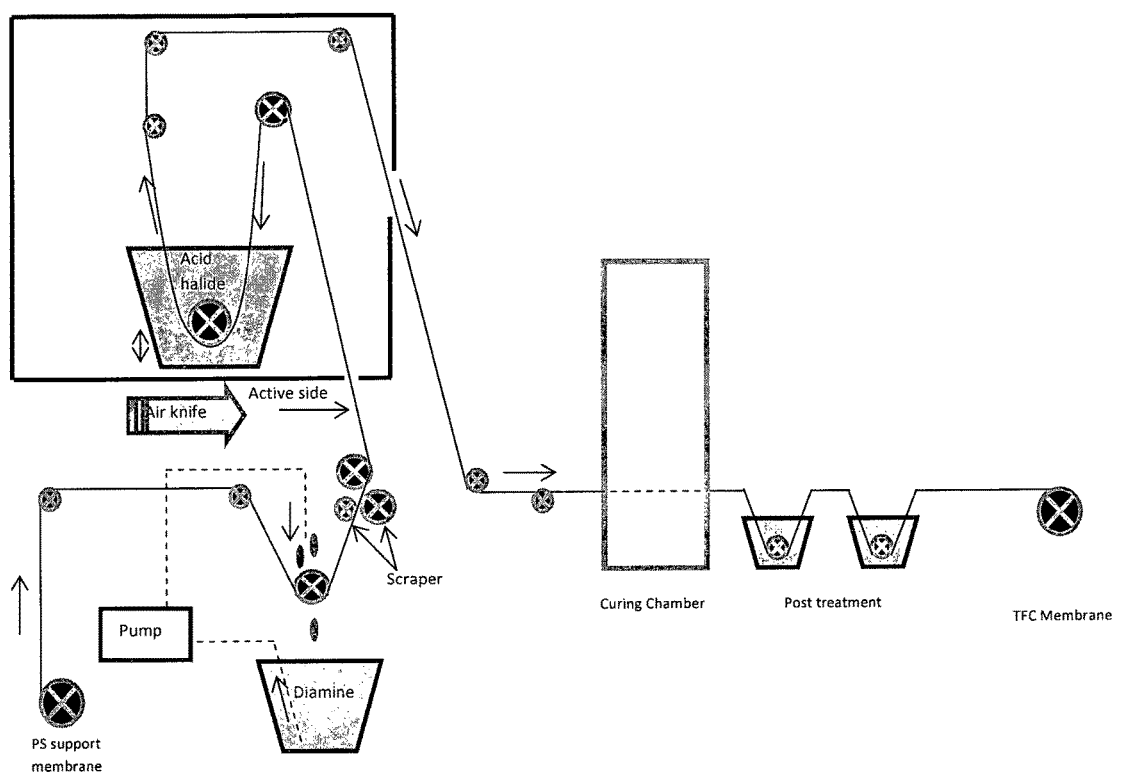
FIG. 4 represents the schematic diagram for the preparation of polyamide ultrathin layer on the top of polysulphone support by the interfacial polymerization process. The polyamide layer preparation unit consists of: i) PSF support membrane unwinding roller, ii) m-phenylenediamine solution bath, iii) trimesyl chloride solution bath, iv) TFC membrane air drying zone v) TFC membrane curing zone vi) TFC membrane winding roller.

Polysulphone membrane that was prepared following the procedure mentioned in step 1 was coated with thin polyamide film under optimized conditions using semi-automated continuous coating machine. Polyamide thin film coating was carried out by interfacial polymerization where diamine in aqueous solution was reacted with acid chloride in hexane at the aqueous-organic (hexane) interface to form the polyamide thin film. Details of machine with description of the steps sequentially are depicted in FIG. 2.

The polysulphone support roller, as prepared in step 1, was fixed to the unwinding roller at one side of the polyamide coating unit and the beginning portion was attached to the winding roller at the other end.

The polysulphone support travels about 2 meters under the forced air to remove any excess water from the surface, before entering the first reactant solution bath.

MPD solution was pumped on a running PSF support membrane in such a way that the residence time of the solution is about 20-40 sec.

PSF support membrane with MPD on top surface travels for 2-4 minutes in air before entering the TMC bath. During this period, the excess MPD solution that was present on the polysulphone surface was removed by air knife and ensured the presence of a thin layer of amine solution on the PSF support membrane surface.

Optimally drained PSF support was passed through TMC solution with the residence time of 20-60 sec. During this period, the amine that was present on PSF support was reacted with TMC in hexane at the aqueous-organic interface to form the thin polyamide film layer on the PSF support.

Membrane was dragged at a constant speed by using a computer controlled single drive capable of maintaining set speed throughout the process.

The membrane dragging rate was fixed at 0.3 m min.1 and therefore maintaining 20 sec residence time of the MPD solution on PSF support membrane and the interfacial reaction time in TMC bath at 30 sec. There is a provision for volume make up for TMC in batches for maintaining the constant volume.

The nascent TFC membrane after coming out from the TMC bath travels for 5 at ambient temperature and then enters the curing zone.

TFC membrane curing temperature was maintained at 50-65° C., and total curing time was 90 seconds.

In the final step the membrane was rolled and washed as described in the next step Step 3: TFC Membrane Post-Treatment and Preservation The TFC membrane roll was dipped in aqueous 2% citric acid solution for 10-30 min and washed by unwinding and winding two times using mechanical arrangement and was washed with water jet. After draining out the excess water the TFC membrane was passed through 10% (v/v) aqueous glycerol solution containing 1.0% (w/v) sodium metabisulphite, dried at 45° C. online. Finally, the TFC membrane was coated with a thin layer of polymer containing hydrophilic functional group by treatment with the solution containing 1-4% of methacrylate monomer containing hydrophilic functional group like SO3H, COOH, OH or PO3H, cross-linking monomer like methylene-bis-acrylamide or ethyeleneglycol dimethacrylate, ceric (iv) ammonium nitrate/sulphate salt and polyvinylalcohol or polyethyleneglycol in presence of nitric acid or sulphuric acid. This membrane was stored and/or used for module making.

EXAMPLES

The following examples are given for illustrative purpose only and therefore these should not be construed to limit the scope of the present invention.

Example 1 (UF Membrane Prepared from Polysulphone Only)

Polysulphone (14%, w/w) is dissolved in dimethylformamide (86%, w/w) under constant stirring rate of 1400 rpm at a temperature of 80° C. for 4 hours to prepare a transparent and light yellow casting solution. The solution is cast on Nordlys TS100 fabric supplied by Filtration Science Corporation, France in a closed chamber. Wet cast thickness between the fabric and the casting knife tip is maintained at 125 μm using the micrometers fixed at both the ends of the casting blade. Humidity inside the chamber is maintained at 16%, temperature is maintained at 32° C. Room temperature is 27° C.; gelation bath temperature is 26° C. The gelation bath composition is 1.9% DMF (v/v), 0.1% sodium lauryl sulphate (SLS) (w/v) in water. Membrane casting length is 80 m. Casting speed is 4 m min-1. Casting speed is maintained by a computer control unit providing roller diameter compensated dragging rate. Table 1 gives the characteristics and performance of the PS support membrane.

TABLE 1

| Properties and performance of UF membrane | |
|---|---|
| UF membrane cut-off (kDa) | |
| UF membrane water flux @ 50 psi (LM-2H-1) | 597.55 |

Example 2 (UF Membrane Prepared from Polysulphone Only)

Polysulphone (14%, w/w) is dissolved in dimethylformamide (86%, w/w) under constant stirring rate of 1400 rpm at a temperature of 75° C. for 4 hours to prepare a transparent golden yellow casting solution. The solution is cast on Nordlys TS100 fabric in a closed chamber. Wet cast thickness is maintained at 130 μm using micrometer fixed with the casting blade. Humidity inside the chamber is maintained at 16%, temperature is maintained at 32° C. Room temperature is 27° C.; gelation bath temperature is 26° C. The gelation bath composition is 1.9% DMF (v/v), 0.1% SLS (w/v) in water. Membrane casting length is 80 m. Casting speed is 4 m min-1. Casting speed is maintained by a computer control unit providing roller diameter compensated dragging rate. Table 2 gives the characteristics and performance of the PS membrane.

TABLE 2

| Properties and performance of UF membrane | |
|---|---|
| Membrane thickness | 130 microns |
| UF membrane water flux @ 50 psi (LM-2H-1) | 426 |

Example 3 (UF Membrane Prepared from Polysulphone Only)

Polysulphone (14%, w/w) is dissolved in dimethylformamide (86%, w/w) under constant stirring rate of 1400 rpm at a temperature of 75° C. for 4 hours to prepare a transparent golden yellow casting solution. The solution is cast on Nordlys TS100 fabric in a closed chamber. Wet cast thickness is maintained at 135 μm using micrometer fixed with the casting blade. Humidity inside the chamber is maintained at 16%, temperature is maintained at 32° C. Room temperature is 27° C.; gelation bath temperature is 26° C. The gelation bath composition is 1.9% DMF (v/v), 0.1% SLS (w/v) in water. Membrane casting length is 80 m. Casting speed is 4 m min-1. Casting speed is maintained by a computer control unit providing roller diameter compensated dragging rate. Table 3 gives the characteristics and performance of the PS membrane.

TABLE 3

| Properties and performance of UF membrane | |
|---|---|
| UF membrane cut-off (kDa) | |
| UF membrane water flux @ 50 psi (LM-2H-1) | 511.00 |

Example 4 (UF Membrane Prepared from Polysulphone Only)

Polysulphone (14%, w/w) is dissolved in dimethylformamide (86%, w/w) under constant stirring rate of 1400 rpm at a temperature of 75° C. for 4 hours to prepare a transparent golden yellow casting solution. The solution is cast on Nordlys TS100 fabric in a closed chamber. Wet cast thickness is maintained at 120 μm using micrometer fixed with the casting blade. Humidity inside the chamber is maintained at 16%, temperature is maintained at 32° C. Room temperature is 27° C.; gelation bath temperature is 26° C. The gelation bath composition is 1.9% DMF (v/v), 0.1% SLS (w/v) in water. Membrane casting length is 80 m. Casting speed is 4 m min-1. Casting speed is maintained by a computer control unit providing roller diameter compensated dragging rate. Table 4 gives the characteristics and performance of the PS membrane.

TABLE 4

| Properties and performance of UF membrane | |
|---|---|
| UF membrane cut-off (kDa) | |
| UF membrane water flux @ 50 psi (LM-2H-1) | 396 |

Example 5 (UF Membrane Prepared from Polysulphone Only)

Polysulphone (14.5%, w/w) is dissolved in dimethylformamide (85.5%, w/w) under constant stirring rate of 1400 rpm at a temperature of 75° C. for 4 hours to prepare a transparent golden yellow casting solution. The solution is cast on Nordlys TS100 fabric in a closed chamber. Wet cast thickness is maintained at 110 μm using micrometer fixed with the casting blade. Humidity inside the chamber is maintained at 16%, temperature is maintained at 32° C. Room temperature is 27° C.; gelation bath temperature is 26° C. The gelation bath composition is 1.9% DMF (v/v), 0.1% SLS (w/v) in water. Membrane casting length is 80 m. Casting speed is 4 m min-1. Casting speed is maintained by a computer control unit providing roller diameter compensated dragging rate. Table 5 gives the characteristics and performance of the PS membrane.

TABLE 5

| Properties and performance of UF membrane | |
|---|---|
| UF membrane cut-off (kDa) | |
| UF membrane water flux @ 50 psi (LM-2H-1) | 560.00 |

Example 6 (UF Membrane Prepared from Polysulphone Only)

Polysulphone (15%, w/w) is dissolved in dimethylformamide (86%, w/w) under constant stirring rate of 1400 rpm at a temperature of 75° C. for 4 hours to prepare a transparent golden yellow casting solution. The solution is cast on Nordlys TS100 fabric in a closed chamber. Wet cast thickness is maintained at 125 μm using micrometer fixed with the casting blade. Humidity inside the chamber is maintained at 16%, temperature is maintained at 32° C. Room temperature is 27° C.; gelation bath temperature is 26° C. The gelation bath composition is 1.9% DMF (v/v), 0.1% SLS (w/v) in water. Membrane casting length is 80 m. Casting speed is 4 m min-1. Casting speed is maintained by a computer control unit providing roller diameter compensated dragging rate. Table 6 gives the characteristics and performance of the PS membrane.

TABLE 6

| Properties and performance of UF membrane | |
|---|---|
| UF membrane cut-off (kDa) | |
| UF membrane water flux @ 50 psi (LM-2H-1) | 511 |

Example 7 (UF Membrane Prepared from Polysulphone Only)

Polysulphone (15%, w/w) is dissolved in dimethylformamide (86%, w/w) under constant stirring rate of 1400 rpm at a temperature of 75° C. for 4 hours to prepare a transparent golden yellow casting solution. The solution is cast on Nordlys TS100 fabric in a closed chamber. Wet cast thickness is maintained at 130 μm using micrometer fixed with the casting blade. Humidity inside the chamber is maintained at 16%, temperature is maintained at 32° C. Room temperature is 27° C.; gelation bath temperature is 26° C. The gelation bath composition is 1.9% DMF (v/v), 0.1% SLS (w/v) in water. Membrane casting length is 80 m. Casting speed is 4 m min-1. Casting speed is maintained by a computer control unit providing roller diameter compensated dragging rate. Table 7 gives the characteristics and performance of the PS membrane.

TABLE 7

| Properties and performance of UF membrane | |
|---|---|
| UF membrane cut-off (kDa) | |
| UF membrane water flux @ 50 psi (LM-2H-1) | 332 |

Example 8 (UF Membrane Prepared from Polysulphone Only)

Polysulphone (15%, w/w) is dissolved in dimethylformamide (86%, w/w) under constant stirring rate of 1400 rpm at a temperature of 75° C. for 4 hours to prepare a transparent golden yellow casting solution. The solution is cast on Nordlys TS100 fabric in a closed chamber. Wet cast thickness is maintained at 120 μm using micrometer fixed with the casting blade. Humidity inside the chamber is maintained at 16%, temperature is maintained at 32° C. Room temperature is 27° C.; gelation bath temperature is 26° C. The gelation bath composition is 1.9% DMF (v/v), 0.1% SLS (w/v) in water. Membrane casting length is 80 m. Casting speed is 4 m min-1. Casting speed is maintained by a computer control unit providing roller diameter compensated dragging rate. Table 8 gives the characteristics and performance of the PS membrane.

TABLE 8

| Properties and performance of UF membrane | |
|---|---|
| UF membrane cut-off (kDa) | |
| UF membrane water flux @ 50 psi (LM-2H-1) | 493 |

Example 9 (TFC RO Membrane Prepared by Interfacial Polymerization)

Polysulphone membrane that was prepared following the procedure mentioned in Example 1 is coated with a thin polyamide active layer according to interfacial polymerization process between a multifunctional amine in water with a multifunctional carboxylic acid chloride in water immiscible solvent like solvent (J. E. Cadotte, R. J. Petersen, R. E. Larson, E. E. Erickson, A new thin-film composite seawater reverse osmosis membrane, Desalination 32 (1981) 25-31; patent application U.S. Pat. No. 4,277,344). Thin film coating is carried out by interfacial polymerization where aqueous diamine phase reacted with acid chloride in hexane at the aqueous-organic (hexane) interface to form the polyamide thin film. The aqueous diamine phase consists of 2% m-phenylenediamine (MPD) (w/v), 1% DMSO (v/v), and 0.5% Glycerol (v/v). The organic solution composition is 0.1% trimesoyl chloride (TMC) (w/v) and 0.025% DMF (v/v) in hexane. In the interfacial polymerization process to prepare polyamide layer over polysulphone support, the support was first contacted with MPD solution for 20 sec by pouring the solution on the running web of polysulphone support. This technique has the advantage that the MPD solution is contacted on the top of polysulphone support only. Subsequently, the excess MPD solution from the surface of the running polysulphone is wiped off by the mirror polished rollers which were arranged at suitable locations in the unit and followed by air knifing on the surface. Subsequently, the optimally drained polysulphone support is passed through the organic solution. During this stage polyamide active layer is formed on the polysulphone support by the interfacial polymerization process between the MPD in the aqueous solution that is present on the polysulphone support and the TMC in hexane solution and thus resulted in the formation of thin film composite membrane. After coming out of the organic solution, the TFC membrane was allowed to travel in the air at ambient temperature for 5 min and then curing temperature is 50° C. in a hot air circulating chamber. The polyamide layer preparation speed was maintained at 0.30 m/min. Table 9 gives the performance of the TFC membrane prepared as in example 9.

TABLE 9

| Performance of TFC membranes | |
|---|---|
| Pressure, psi/NaCl concentration, ppm | 250/2200 |
| Flux, LM-2H-1 | 44.94 |
| Rejection, % | 96.66 |

Example 10 (TFC RO Membrane Prepared by Interfacial Polymerization)

Polysulphone membrane is prepared following the procedure mentioned in example 1 is coated with thin polyamide film. Thin film coating is carried out by interfacial polymerization where aqueous diamine phase reacted with acid chloride in hexane at the aqueous-organic (hexane) interface to form the polyamide thin film. The aqueous diamine composition is 2% MPD (w/v), 1% DMSO (v/v), 0.5% Glycerol (v/v) and acid chloride in hexane composition is 0.125% TMC (w/v), 0.025% DMF (v/v). The excess MPD solution from the polysulfone surface after coming out of the diamine bath is wiped off, and remaining is distributed uniformly by the use of rollers and blowing air. TFC membrane curing temperature is 50° C.; coating speed is 0.30 m min-1. Table 10 gives the performance of the TFC membrane.

TABLE 10

| Performance of TFC membranes | |
|---|---|
| Pressure, psi/NaCl concentration, ppm | 250/2200 |
| Flux, LM-2H-1 | 46.16 |
| Rejection, % | 97.36 |

Example 11 (TFC RO Membrane Prepared by Interfacial Polymerization)

Polysulphone membrane is prepared following the procedure mentioned in example 4 is coated with thin polyamide film. Thin film coating is carried out by interfacial polymerization where aqueous diamine phase reacted with acid chloride in hexane at the aqueous-organic (hexane) interface to form the polyamide thin film. The aqueous diamine composition is 2% MPD (w/v), DMSO (v/v), 0.5% Glycerol (v/v) and acid chloride in hexane composition is 0.1% TMC (w/v), 0.025% DMF (v/v). The excess MPD solution from the polysulphone surface after coming out of the diamine bath is wiped off, and remaining is distributed uniformly by the use of rollers and blowing air. TFC membrane curing temperature is 60° C., coating speed is 0.30 m min$^{-1}$. Table 11 gives the performance of the TFC membrane.

TABLE 11

| Performance of TFC membranes | |
|---|---|
| Pressure, psi/NaCl concentration, ppm | 250/2200 |
| Flux, LM-2H-1 | 43 |
| Rejection, % | 95.66 |

Example 12 (TFC RO Membrane Prepared by Interfacial Polymerization)

Polysulphone membrane is prepared following the procedure mentioned in example 5 is coated with thin polyamide film. Thin film coating is carried out by interfacial polymerization where aqueous diamine phase reacted with acid chloride in hexane at the aqueous-organic (hexane) interface to form the polyamide thin film. The aqueous diamine composition is 2% MPD (w/v), 1% DMSO (v/v), 0.5% Glycerol (v/v) and acid chloride in hexane composition is 0.1% TMC (w/v), 0.025% DMF (v/v). The excess MPD solution from the polysulphone surface after coming out of the diamine bath is wiped off, and remaining is distributed uniformly by the use of rollers and blowing air. TFC membrane curing temperature is 60° C., coating speed is 0.30 m min-1. Table 12 gives the performance of the TFC membrane.

TABLE 12

Performance of TFC membranes

| | |
|---|---|
| Pressure, psi/NaCl concentration, ppm | 250/2200 |
| Flux, LM-2H-1 | 35.30 |
| Rejection, % | 95.48 |

Example 13 (TFC RO Membrane Prepared by Interfacial Polymerization)

Polysulphone membrane is prepared following the procedure mentioned in example 6 is coated with thin polyamide film. Thin film coating is carried out by interfacial polymerization where aqueous diamine phase reacted with acid chloride in hexane at the aqueous-organic (hexane) interface to form the polyamide thin film. The aqueous diamine composition is 2% MPD (w/v), 1% DMSO (v/v), 0.5% Glycerol (v/v) and acid chloride in hexane composition is 0.1% TMC (w/v), 0.025% DMF (v/v). The excess MPD solution from the polysulphone surface after coming out of the diamine bath is wiped off, and remaining is distributed uniformly by the use of rollers and blowing air. TFC membrane curing temperature is 60° C., coating speed is 0.30 m min-1. Table 13 gives the performance of the TFC membrane.

TABLE 13

Performance of TFC membranes

| | |
|---|---|
| Pressure, psi/NaCl concentration, ppm | 250/2200 |
| Flux, LM-2H-1 | 56.14 |
| Rejection, % | 96.63 |

Example 14 (TFC RO Membrane Prepared by Interfacial Polymerization)

Polysulphone membrane is prepared following the procedure mentioned in example 2 is coated with thin polyamide film. Thin film coating is carried out by interfacial polymerization where aqueous diamine phase reacted with acid chloride in hexane at the aqueous-organic (hexane) interface to form the polyamide thin film. The aqueous diamine composition is 2% MPD (w/v), 1% DMSO (v/v), 0.5% Glycerol (v/v) and acid chloride in hexane composition is 0.1% TMC (w/v), 0.025% DMF (v/v). The excess MPD solution from the polysulphone surface after coming out of the diamine bath is wiped off, and remaining is distributed uniformly by the use of rollers and blowing air. TFC membrane curing temperature is 60° C., coating speed is 0.30 m min-1. Table 14 gives the performance of the TFC membrane.

TABLE 14

Performance of TFC membranes

| | |
|---|---|
| Pressure, psi/NaCl concentration, ppm | 250/2200 |
| Flux, LM-2H-1 | 49.72 |
| Rejection, % | 94.28 |

Example 15 (TFC RO Membrane Prepared by Interfacial Polymerization)

Polysulphone membrane is prepared following the procedure mentioned in example 3 is coated with thin polyamide film. Thin film coating is carried out by interfacial polymerization where aqueous diamine phase reacted with acid chloride in hexane at the aqueous-organic (hexane) interface to form the polyamide thin film. The aqueous diamine composition is 2% MPD (w/v), 1% DMSO (v/v), 0.5% Glycerol (v/v) and acid chloride in hexane composition is 0.1% TMC (w/v), 0.025% DMF (v/v). The excess MPD solution from the polysulphone surface after coming out of the diamine bath is wiped off, and remaining is distributed uniformly by the use of rollers and blowing air. TFC membrane curing temperature is 50° C., coating speed is 0.30 m min-1. Table 15 gives the performance of the TFC membrane.

TABLE 15

Performance of TFC membranes

| | |
|---|---|
| Pressure, psi/NaCl concentration, ppm | 250/2200 |
| Flux, LM-2H-1 | 61.65 |
| Rejection, % | 95.45 |

Example 16 (TFC RO Membrane Prepared by Interfacial Polymerization)

Polysulphone membrane is prepared following the procedure mentioned in example 3 is coated with thin polyamide film. Thin film coating is carried out by interfacial polymerization where aqueous diamine phase reacted with acid chloride in hexane at the aqueous-organic (hexane) interface to form the polyamide thin film. The aqueous diamine composition is 3% MPD (w/v), 1% DMSO (v/v), 0.5% Glycerol (v/v) and acid chloride in hexane composition is 0.1% TMC (w/v), 0.025% DMF (v/v). The excess MPD solution from the polysulphone surface after coming out of the diamine bath is wiped off, and remaining is distributed uniformly by the use of rollers and blowing air. TFC membrane curing temperature is 50° C., coating speed is 0.30 m min-1.

The TFC membrane was treated with the aqueous solution containing sulphopropyl methacrylate ($2 \times 10^{-2}$ mol/lit) methylene-bis-acrylamide (MBA) ($9.5 \times 10^{-3}$ mole/lit) polyvinyl alcohol (PVA) ($2 \times 10^{-2}$ mol/L), nitric acid ($2 \times 10^{-2}$ mol/L) and ceric ammonium nitrate ($2 \times 10^{-3}$ mol/L) for 15 min at room temperature. This has resulted in the formation of an ultrathin polymethacrylate layer with very high charge and hydrophilicity over the top of polyamide active layer. The modified membrane showed 30-40% flux enhancement with marginal decrease in rejection efficiency (1-2%) after treatment with sodium hypochlorite solution (NaOCl) (1000 ppm) for 4 h. In comparison, the unmodified conventional TFC membranes showed 10-50% decline in flux and 2-5% decline in NaCl rejection efficiency after treatment with same NaOCl solution. Table 16 gives the performance of the TFC membrane.

TABLE 16

Performance of TFC membranes

| Pressure, psi/NaCl concentration, ppm | 250/2200 |
|---|---|
| Flux, LM-2H-1 | 54.28 |
| Rejection, % | 97.02 |

Example 17 (TFC RO Membrane Prepared by Interfacial Polymerization)

Polysulphone membrane is prepared following the procedure mentioned in example 7 is coated with thin polyamide film. Thin film coating is carried out by interfacial polymerization where aqueous diamine phase reacted with acid chloride in hexane at the aqueous-organic (hexane) interface to form the polyamide thin film. The aqueous diamine composition is 3% MPD (w/v), 1% DMSO (v/v), 0.5% Glycerol (v/v) and acid chloride in hexane composition is 0.125% TMC (w/v), 0.025% DMF (v/v). The excess MPD solution from the polysulphone surface after coming out of the diamine bath is wiped off, and remaining is distributed uniformly by the use of rollers and blowing air. TFC membrane curing temperature is 50° C., coating speed is 0.30 m min-1.

The TFC membrane was similarly treated with the aqueous solution of monomers as described in example 16 and properties in term of permeate flux and NaCl rejection after treatment with NaOCl solution were found to be similar to the one as described in Example 16. Table 17 gives the performance of the TFC membrane.

TABLE 17

Performance of TFC membranes

| Pressure, psi/NaCl concentration, ppm | 250/2200 |
|---|---|
| Flux, LM-2H-1 | 46.31 |
| Rejection, % | 96.34 |

Example 18 (TFC RO Membrane Prepared by Interfacial Polymerization)

Polysulphone membrane is prepared following the procedure mentioned in example 3 is coated with thin polyamide film. Thin film coating is carried out by interfacial polymerization where aqueous diamine phase reacted with acid chloride in hexane at the aqueous-organic (hexane) interface to form the polyamide thin film. The aqueous diamine composition is 2.5% MPD (w/v), 1% DMSO (v/v), 0.5% Glycerol (v/v) and acid chloride in hexane composition is 0.125% TMC (w/v), 0.025% DMF (v/v). The excess MPD solution from the polysulphone surface after coming out of the diamine bath is wiped off, and remaining is distributed uniformly by the use of rollers and blowing air. Humidity is maintained at 58-68% in side coating chamber. TFC membrane curing temperature is 50° C., coating speed is 0.30 m min-1.

The TFC membrane was treated with the aqueous solution containing 1-2 g/100 mL of methacrylate monomer like The TFC membrane was similarly treated with the aqueous solution of monomers as described in example 16 and the properties in term of permeate flux and NaCl rejection after treatment with NaOCl solution were found to be similar to the one as described in Example 16. Table 18 gives the performance of the TFC membrane.

TABLE 18

Performance of TFC membranes

| Pressure, psi/NaCl concentration, ppm | 250/2200 |
|---|---|
| Flux, LM-2H-1 | 67.67 |
| Rejection, % | 97.35 |

Example 19 (TFC RO Membrane Prepared by Interfacial Polymerization)

Polysulphone membrane is prepared following the procedure mentioned in example 1 is coated with thin polyamide film. Thin film coating is carried out by interfacial polymerization where aqueous diamine phase reacted with acid chloride in hexane at the aqueous-organic (hexane) interface to form the polyamide thin film. The aqueous diamine composition is 2% MPD (w/v), 1% DMSO (v/v), 0.5% Glycerol (v/v) and acid chloride in hexane composition is 0.1% TMC (w/v), 0.025% DMF (v/v). The excess MPD solution from the polysulfone surface after coming out of the diamine bath is wiped off, and remaining is distributed uniformly by the use of rollers and blowing air. TFC membrane is not cured; coating speed is 0.30 m min-1.

The TFC membrane was similarly treated with the aqueous solution of monomers as described in example 16 and the properties in term of permeate flux and NaCl rejection after treatment with NaOCl solution were found to be similar to the one as described in Example 16. Table 19 gives the performance of the TFC membrane.

TABLE 19

Performance of TFC membranes

| Pressure, psi/NaCl concentration, ppm | 250/2200 |
|---|---|
| Flux, LM-2H-1 | 38.03 |
| Rejection, % | 97.33 |

Example 20 (TFC RO Membrane Prepared by Interfacial Polymerization)

Polysulphone membrane is prepared following the procedure mentioned in example 4 is coated with thin polyamide film. Thin film coating is carried out by interfacial polymerization where aqueous diamine phase reacted with acid chloride in hexane at the aqueous-organic (hexane) interface to form the polyamide thin film. The aqueous diamine composition is 2% MPD (w/v), 1% DMSO (v/v), 0.5% Glycerol (v/v) and acid chloride in hexane composition is 0.1% TMC (w/v), 0.025% DMF (v/v). The excess MPD solution from the polysulphone surface after coming out of the diamine bath is wiped off, and remaining is distributed uniformly by the use of rollers only. TFC membrane is cured at 60° C.; coating speed is 0.30 m min-1. Table 20 gives the performance of the TFC membrane.

TABLE 20

Performance of TFC membranes

| Pressure, psi/NaCl concentration, ppm | 250/2200 |
|---|---|
| Flux, LM-2H-1 | 16.20 |
| Rejection, % | 90.41 |

Example 21 (Modification of TFC RO Membrane Prepared by Interfacial Polymerization)

Polysulphone membrane prepared following the procedure mentioned in example 3 was coated with thin polyamide film. Thin film coating was carried out by interfacial polymerization where aqueous diamine phase reacted with acid chloride in hexane at the aqueous-organic (hexane) interface to form the polyamide thin film. The aqueous diamine composition was 2.5% MPD (w/v), 1% DMSO (v/v), 0.5% Glycerol (v/v), 0.1% SPMA (sulphopropyl methacrylate) (w/v), 0.01% MBA (methylene-bis-acrylamide) (w/v) and acid chloride in hexane composition was 0.125% TMC (w/v), 0.025% DMF (v/v). Potassium persulphate was used as polymerization reaction initiator. The excess aqueous solution from the polysulphone surface after coming out of the diamine bath was wiped off, and remaining was distributed uniformly by the use of rollers only. The modified TFC membrane was cured at 60° C.; coating speed was 0.30 m min-1. Table 21 gives the performance of the modified TFC membrane. FIG. 1 and FIG. 2 present the effect of membrane modification on membrane morphology and performance respectively. The modified TFC membranes showed 0-20% reduction in flux without affecting NaCl rejection efficiency after 20 h of continuous filtration of NaCl solution. Whereas the unmodified TFC membrane showed about 65% reduction in flux after 20 h of continuous filtration operation.

TABLE 21

Performance of TFC membranes

| Pressure, psi/NaCl concentration, ppm | 250/2200 |
|---|---|
| Flux, LM-2H-1 | 42.07 |
| Rejection, % | 96.13 |

Example 22 (Modification of TFC RO Membrane Prepared by Interfacial Polymerization)

Polysulphone membrane prepared following the procedure mentioned in example 3 was coated with thin polyamide film. Thin film coating was carried out by interfacial polymerization where aqueous diamine phase reacted with acid chloride in hexane at the aqueous-organic (hexane) interface to form the polyamide thin film. The aqueous diamine composition was 2.5% MPD (w/v), 1% DMSO (v/v), 0.5% Glycerol (v/v), 0.1% SPMA (sulphopropyl methacrylate) (w/v), 0.01% MBA (methylene-bis-acrylamide) (w/v), polyvinyl alcohol (PVA) 1×10−2 mol L-1 and acid chloride in hexane composition was 0.125% TMC (w/v), 0.025% DMF (v/v). Potassium persulphate was used as polymerization reaction initiator. The excess aqueous solution from the polysulfone surface after coming out of the diamine bath was wiped off, and remaining was distributed uniformly by the use of rollers only. The modified TFC membrane was cured at 60° C.; coating speed was 0.30 m min-1. Table 22 gives the average performance of the modified TFC membrane. FIG. 2 presents the effect of membrane modification on membrane long term performance respectively. The modified TFC membranes showed 0-20% reduction in flux without affecting NaCl rejection efficiency after 20 h of continuous filtration of NaCl solution. Whereas the unmodified TFC membrane showed about 65% reduction in flux after 20 h of continuous filtration operation.

TABLE 22

Performance of TFC membranes

| Pressure, psi/NaCl concentration, ppm | 250/2200 |
|---|---|
| Flux, LM-2H-1 | 52.5 |
| Rejection, % | 97.5 |

ADVANTAGE OF THE PRESENT INVENTION

1. Fabrication of TFC membranes (100×100 m$^2$) with indigenously designed and developed semi-automated polysulphone casting and TFC polyamide coating machines.
2. Cost effective technology for preparation of TFC support membranes and polyamide TFC membranes thereof.
3. Improvement of fouling resistance property of the TFC membranes by simple and robust post treatment method and thus improvement in the membrane life.
4. Improvement of chlorine stability by simple and robust post treatment of the TFC membranes.

We claim:

1. A modified thin film composite (TFC) reverse osmosis membrane on conventional polysulphone support wherein the membrane comprises a polyamide ultrathin layer which is formed by an interfacial polymerization reaction at the aqueous-organic interface between an aqueous diamine phase and an organic-acid chloride phase in presence of 0.27-2.7% Red-Ox initiator at temperature ranging between 20-40° C. for a period ranging between 10-60 min followed by curing the said membrane at temperature ranging between 50-70° C.;
wherein:
the aqueous diamine phase comprises 2-3% phenylenediamine MPD (w/v), 0.5-1.5% dimethylsulfoxide DMSO (v/v), 0.2-1% Glycerol (v/v), 0.1-1% sulphopropyl methacrylate SPMA (w/v), 0.01% (methylene-bis-acrylamide) MBA (w/v), 0.1% polyvinyl alcohol (PVA) (w/v); and
the organic acid chloride phase comprises 0.1-0.125% trimesoyl chloride TMC (w/v), 0.01-0.05% dimethylformamide DMF (v/v), and hexane.

2. A modified thin film composite reverse osmosis membrane as claimed in claim 1, wherein said membrane is characterized by 96-97.5% salt rejection and 38-67.6 LM$^{-2}$H$^{-}$1 flux with 2200 ppm sodium chloride solution at 250 psi i.e. 1723.689 kPa pressure at 27° C.

3. Use of a modified thin film composite reverse osmosis membrane as claimed in claim 1, in brackish water purification.

4. Use of a modified thin film composite reverse osmosis membrane as claimed in claim 1, in high salinity water purification.

* * * * *